US008928928B2

(12) United States Patent
Steffen

(10) Patent No.: US 8,928,928 B2
(45) Date of Patent: Jan. 6, 2015

(54) BLOG PROCESSING

(75) Inventor: Guido Steffen, Meilen (CH)

(73) Assignee: Ferag AG, Hinwil (CH)

(*) Notice: Subject to any disclaimer, the term of this patent is extended or adjusted under 35 U.S.C. 154(b) by 992 days.

(21) Appl. No.: 12/311,792

(22) PCT Filed: Oct. 12, 2007

(86) PCT No.: PCT/CH2007/000504

§ 371 (c)(1),
(2), (4) Date: Apr. 13, 2009

(87) PCT Pub. No.: WO2008/043195

PCT Pub. Date: Apr. 17, 2008

(65) Prior Publication Data

US 2010/0031840 A1 Feb. 11, 2010

(30) Foreign Application Priority Data

Oct. 13, 2006 (CH) .................................... 1633/06

(51) Int. Cl.
*G06K 15/00* (2006.01)
*G06F 3/12* (2006.01)
*B65H 39/00* (2006.01)
*G06F 9/44* (2006.01)
*G06F 9/445* (2006.01)
*B41F 13/46* (2006.01)

(52) U.S. Cl.
CPC .................................... *B41F 13/46* (2013.01)
USPC ......... 358/1.18; 358/1.15; 358/1.16; 358/1.1; 358/1.9; 270/52.06; 270/52.15; 717/122; 717/121; 717/123

(58) Field of Classification Search
USPC ................ 358/1.15, 1.18, 1.1, 1.16; 715/769; 399/81
See application file for complete search history.

(56) References Cited

U.S. PATENT DOCUMENTS 5,324,014 A 6/1994 Honegger et al.
5,377,904 A * 1/1995 Michlin et al. ................. 229/70

(Continued)

FOREIGN PATENT DOCUMENTS

CH 01508/06 9/2006
DE 195 12 501 A1 10/1996

(Continued)

OTHER PUBLICATIONS http://en.wikipedia.org/wiki/Bar code, Barcode, Wikipedia the free encyclopedia website, pp. 1-14.

*Primary Examiner* — Akwasi M Sarpong
(74) *Attorney, Agent, or Firm* — Pauley Petersen & Erickson

(57) ABSTRACT

The invention proposes a method for producing a printed product, in which a printed product, preferably produced in a forme-bound high-capacity printing process, in the form of a main product (2) or a subproduct is provided with an identification means which comprises a piece of individualizable product-specific information. At least two downstream individualization steps are performed, wherein the identification means allow the piece of information which is to be added in the at least two further downstream individualization steps to be associated with the respective product. Preferably, the new addressee-specific digital printed product comprises blog articles, preferably in the form of a blog insert, which is in turn preferably produced using digital printing. Identification means, for example in the form of ID tags (4, 4'), comprise not only the product-specific identification information but preferably also control information (31-36) which can be read by sensors on the handling devices (7-12) and hence directly control the handling of the respective product by this at least one handling device (7-12) and, in cooperation with inspection codes on the subproducts to be supplied, allow the correct supply to be inspected. The present invention also allows uninterrupted compilation of product packages for postal dispatch by virtue of the product sequence in the course of the conveying line comprising, at least in sections, a recurring succession of a respective one or more intermediate products partly individualized on an addressee-specific basis and at least one, preferably a plurality of, non-individualized standard intermediate products.

17 Claims, 3 Drawing Sheets

(56) References Cited

U.S. PATENT DOCUMENTS

| | | | | |
|---|---|---|---|---|
| 5,493,634 | A * | 2/1996 | Bonk et al. | 358/1.1 |
| 5,613,669 | A * | 3/1997 | Grueninger | 270/52.06 |
| 5,813,348 | A * | 9/1998 | Zingher | 101/494 |
| 5,978,559 | A * | 11/1999 | Quinion | 358/1.15 |
| 6,411,314 | B1 * | 6/2002 | Hansen et al. | 715/769 |
| 6,429,946 | B1 * | 8/2002 | Bresnan et al. | 358/1.15 |
| 6,678,068 | B1 * | 1/2004 | Richter et al. | 358/1.15 |
| 6,944,412 | B2 * | 9/2005 | Mishima et al. | 399/81 |
| 7,284,061 | B2 * | 10/2007 | Matsubayashi et al. | 709/229 |
| 7,639,386 | B1 * | 12/2009 | Siegel et al. | 358/1.18 |
| 7,697,160 | B1 * | 4/2010 | Brosius | 358/1.2 |
| 7,743,364 | B2 * | 6/2010 | Nakata et al. | 717/122 |
| 7,760,378 | B2 * | 7/2010 | Maruyama | 358/1.15 |
| 7,762,460 | B2 * | 7/2010 | Higuchi | 235/440 |
| 2002/0048037 | A1 * | 4/2002 | Carbone | 358/1.14 |
| 2004/0267616 | A1 * | 12/2004 | Kargman | 705/14 |
| 2005/0044476 | A1 * | 2/2005 | Bursten | 715/500 |
| 2006/0080122 | A1 * | 4/2006 | Klopsch et al. | 705/1 |
| 2008/0101272 | A1 * | 5/2008 | Hayes et al. | 370/313 |
| 2013/0103389 | A1 * | 4/2013 | Gattani et al. | 704/9 |

FOREIGN PATENT DOCUMENTS

| | | | |
|---|---|---|---|
| DE | 197 04 003 | A1 | 8/1998 |
| DE | 103 00 071 | A1 | 7/2004 |
| EP | 0 805 756 | B1 | 11/1997 |
| EP | 1 086 914 | B1 | 3/2001 |
| EP | 1 106 550 | B1 | 6/2001 |
| EP | 1 155 850 | A2 | 11/2001 |
| EP | 1 275 607 | B1 | 1/2003 |
| JP | 10-235823 | | 9/1998 |
| JP | 2002-289017 | | 10/2002 |
| JP | 2003-11938 | | 1/2003 |
| JP | 2003-36215 | | 2/2003 |
| JP | 2003-108631 | | 4/2003 |
| JP | 2006-134110 | | 5/2006 |
| JP | 2006-227685 | | 8/2006 |

* cited by examiner

BLOG PROCESSING

FIELD OF THE INVENTION

The present invention relates to a printed product in accordance with the precharacterizing part of Patent Claim 1, a method for producing a printed product in accordance with the precharacterizing part of Patent Claim 15, and a system for producing a printed product in accordance with the precharacterizing part of Patent Claim 16.

BACKGROUND OF THE INVENTION

Swiss patent application No. 01508/06 describes a new printed product and a new production method and a new system for producing printed products which develop web logs and the blog articles they contain as a news source for conventional printed media. The attractiveness of blog articles in conventional printed media, particularly of topical blog articles in daily newspapers, is described in more detail in the aforementioned application, and reference is made to the full content of the statements therein in respect of details. Thus, blog articles may appeal to a new class of reader as an addition to or substitute for agency communications and correspondent reports in printed media, or may meet previously unmet information requirements in existing readers or even arouse them for the first time. The aforementioned application proposes producing a non-individualized printed product with a high circulation as inexpensively as possible.

The present application is now intended to use the advantages of blog articles in the printed product in order to produce a partly individualized printed product.

The subject of individualized printed products has concerned the printing industry for decades. A wide variety of technical solutions have been proposed from simply printing an address on a newspaper through to printing newspaper which is fully individual for a reader. The desired individualization then appears to be positively correlated to costs, which means that in all known methods and apparatuses, not a single one of which has been able to establish itself on the market, at least as far as dailies and weeklies are concerned, the price of the product inevitably rises as the degree of individualization increases.

When competing with other newspapers and particularly electronic media, there is also an increasing pressure for the conventional printed media, in this case again particularly the dailies, to be topical. The use of high-capacity systems, which can currently produce up to 80,000 products an hour, not only allows production costs to be kept down but also allows for the copy deadline to be pushed further back, since production requires less time. The reader expects “last-minute” events from the evening to be reported in the newspaper the next day. There is thus an even greater pressure for the desired individualization to be topical.

The cost problem as a result of the desired individualization has been known for a long time, and hence EP0805756 from the applicant, for example, describes a method whose basic idea is to systematically use the greatest possible degree of flexibility by virtue of digital printing. Since the digital printing methods actually involve “formes” being perpetually created afresh, the flexibility of such methods is orders of magnitude greater than the flexibility of printing methods which use real formes. The term “digital printing” in EP0805756, as in the present application too, refers to all printing methods in which solid formes are not printed onto the paper but rather a “writing means” is digitally actuated such that, with continual alteration as appropriate, it writes the prescribed samples onto the paper. Examples of the best known of these methods are laser and inkjet methods and various thermal methods. In the present invention, forme-bound printing methods, unless expressly mentioned, are referred to across the board as “conventional printing”. For the present application, conventional printing is also intended to be understood to mean high-capacity printing, in particular, in which, today, quantities achieved are 80,000 printed products per hour and more.

In the method proposed in EP0805756, the material which is printed and the further processing of the printed material to produce finished printed products are systematically matched to this high flexibility. In this case, a digital printing method is used to print all the printed pages of a printed product onto the front and back of a more or less continuous paper web. For printing, the paper web is guided essentially continuously through an appropriate printing apparatus and is printed in the form of at least one respective row of adjacent printed pages on both sides. The paper web is folded, prior to or after printing, between the pages of the rows of printed pages to be printed or already printed to form a folded stack and is disjointed transversely with respect to its longitudinal direction or at least put into an easy-to-separate state (e.g. perforation or partial disjointing). This produces a sequence of fan-folded (fan-fold) printed products whose first and last pages may possibly still be connected to one another but are simple to separate. EP0805756 already discloses the practice of distributing such printed products to the reader in fan-folded form directly or of processing them further to produce a wide variety of inherently known forms of printed products. Despite the advantageous proposals for a solution, the costs of producing such an individualized printed product are in the same measure, particularly when using colour printing, far above the costs of a product produced conventionally using the high-capacity process. The cost problem is thus not solved satisfactorily.

In the printed specification for EP0805756, the loss of efficiency and the attendant cost increases already address two problems which are entailed by the desired individualization of printed products such as newspapers and periodicals. This patent specification also discusses approaches to organizing the desired smaller editions and the increased individualization of copies in appropriate fashion in the further processing of the printed products and to designing, controlling and coupling particularly the further-processing apparatus in appropriate fashion in order to increase flexibility and to make it possible to produce individualized products to a greater degree without altering the printing method per se. It is proposed that newspapers or periodicals which have been printed as a uniform edition per se be individualized and made ready for dispatch by virtue of the following further-processing steps: insertion of inserts, compiled according to the addressee, which, at least in part, can also be printed on an addressee-specific basis by a printer which is provided specifically for this purpose (e.g. reply cards provided with an individual sender’s address), additional individual printing on insides or outsides (e.g. individual addressing), packaging individually or in assembled packages according to addresses, for which assembled packages a further printer is used to produce address sheets and delivery notes, for example. It is also proposed that the individualized periodicals be compiled in a sequence which is correct for the postal route and be packaged into assembled packages. However, EP0805756 already recognizes that the software and control-engineering sophistication for such methods is quite obviously considerable, and accordingly an extremely simple production method is proposed for fan-folded products which is very well suited to decentralized production. Preferably, this involves digital print data being supplied by a wide variety of sources to a wide variety of production locations on demand, for example via the telephone network.

Despite this possible decentralization, this method for producing individualized printed products, like many other methods of the same kind, has not been able to establish itself on the market to date.

In the case of the known solutions, the desired individualization within the context of the conventional high-capacity printing results in complex systems whose complexity makes them more susceptible to errors and/or means that they require sophisticated superordinate control systems which are inclined to failures and associated system stoppages.

It is therefore an object of the invention to provide a method and a system for producing printed products of the cited kind which avoid the drawbacks described above.

It is also the object of the invention to use known high-capacity methods and systems in order to produce an inexpensive printed product which permits a selectable degree of individuality and high level of topicality. This object is intended to be achieved for a wide variety of kinds of printed products, for example including for extensive assembled and/or stapled printed products with blog articles.

It is also an object of the invention to provide a method and a system which allow forme-bound high-capacity printing processes and non-forme-bound printing processes to be integrated when producing a partly individualized printed product, particularly for creating a product with blog articles.

A further object of the present invention is to provide a method and a system which allows correct addressing and particularly a correct sequence for the products which are to be addressed and those addressed, and hence allows the subsequent delivery, easily and inexpensively, with relatively high efficiency without any increased machine sophistication.

This object is achieved by the features contained in the characterizing part of Claims 1, 15 and 16.

The method according to the invention involves printed products, which have preferably been produced in a conventional high-capacity printing method, for example forme-bound using rotary printing, being provided with an identification means (IM) in the rotary section or between rotary section and a first further-processing apparatus connected downstream of the rotary section. The identification means carries the information for identifying the products and renders them identifiable. This rendering identifiable preferably occurs at a level which allows every single printed product to be identified, and will subsequently be referred to as individual rendering identifiable (indification). In contrast, it is also possible to provide groups of products with an IM with identical identification information, which in the context of this application will be called omnification. In line with a first preferred embodiment of the invention, the identification means has an associated ID tag which, in the printed state, is preferably implemented as a machine-readable two-dimensional or matrix barcode. Basic information relating to different types of barcodes is known and available at http://en.wikipedia.org/wiki/Bar code, for example, and will not be repeated again here. Using two-dimensional barcodes, such as the Data Matrix Code, it is currently possible—depending on the size of the tag—to store up to 2 kilobytes of data and show them in printed form. The code is either fitted directly onto the printed product or onto an adhesive label which is to be fitted to the printed product using a digital printing method, or alternatively it is possible for the identification means (IM) also to be implemented as electronically readable or read/writable electronic memories, preferably as tags in the form of RFID tags. Combinations of the aforementioned identification means (IM) are likewise possible. Thus, it is possible to stick RFID tags printed with a visually ascertainable matrix code fitted on the visible side onto the products according to requirements, for example.

In line with a further preferred embodiment of the present invention, the identification means (IM) is not fitted directly on or to the printed product but rather has a resolvable, temporary direct physical association with the printed product. In this case, the identification means may be in the form of read/writable electronic memories, for example, preferably in the form of RFID tags in a transport unit associated with the printed product, for example a pocket on an insertion apparatus and/or a grab on a grab transporter.

In line with a further preferred embodiment, the identification means is associated with the printed product no longer in a physical association but rather in a superordinate control device which detects the position of each product in the production process in relation to the handling stations used in the process and simultaneously associates the product-specific identification means preferably in the form of an electronic identification code in the control device.

In preferred embodiments in which the printed products are provided directly with the identification means (IM), the IM comprises at least one identification (ID) tag, which is in turn compiled from a number of single-bit codes and at least one multibit code. It has been found to be advantageous to fit the ID tags onto the printed product directly in or immediately downstream of the rotary section on the interface for further processing, at any rate upstream of the first downstream handling station, using a digital printer. Preferably, it is the main products which are indificated in this way.

In the case of printed products assembled with some complexity which comprise a main product and a plurality of first-order subproducts and/or advertising inserts, for example, which themselves in turn contain inserted (second-order) subproducts, the first-order subproducts are preferably also provided with an IM. For the sake of simplicity, however, the basic idea of the invention will be explained below first using the example of indification of a main product in a daily newspaper. Onto every main product, an ID tag is printed in the marginal area using a digital printing unit (e.g. an inkjet printer), for example, in or after the rotary section. The ID tag is preferably positioned in the marginal area of the front page, and is not cut away in the event of any marginal bleed. In the simplest case, it comprises a multibit code, which may be an individual or group-associated product number, for example. Preferably, the ID tag comprises one or more pieces of control information for downstream processing units, however, which are in turn respectively in the form of 1-bit codes in the simplest case. When the present application refers to an ID tag, this is not intended to mean that the ID tag is printed as a three-dimensional unit. It is entirely possible for portions of the ID tag, which forms a functional unit, to be positioned at different points on a front page if this improves legibility or simplifies later reading.

The information contained in the ID tag comes from a superordinate control system and is supplied to the digital printing unit online or via a locally readable storage medium and is preferably buffer-stored in the digital printing unit.

As already mentioned previously, the present invention is preferably used for producing printed products individualized on an addressee-specific basis. In line with one preferred embodiment, these are printed products such as newspapers and periodicals which comprise blog articles compiled individually for the addressee, for example in the form of a blog insert as an inserted product. The addressee, that is to say the subscriber to the newspaper or periodical, receives a blog insert compiled individually for him. The methods and criteria for selecting the articles for the blog insert are essentially known to a person skilled in the art from the field of individual electronic periodicals, also known by the buzzword "Daily Me". The subscriber has the option of compiling the articles for himself on the basis of his guidelines. Preferably, this is done using online access to a user portal. A user profile is generated and stored which is the basis for preferably automated selection of blog articles for the addressee-specific blog insert to be created. The options for producing an individual electronic newspaper are described by way of example in the publication "Chancen und Risiken einer individuellen Informationsvermittlung" [Opportunities and risks of individual communication of information] by R. Specker from 1997. Within the context of the present invention, the term blog articles in the wider sense also includes advertisements and editorial articles and also graphical material which is compiled in a preliminary printing stage in the layout process for one or more pages.

A person skilled in the art is aware that printed products which are compiled individually for a known addressee provide extremely attractive and lucrative advertising opportunities. The technical aspects for the implementation and use of these advertising opportunities will therefore not be discussed in any depth below.

As already mentioned previously, the blog articles are preferably added to the conventionally produced printed product indificated previously in the form of a digitally printed blog insert. As will be explained below, the indification of the conventionally produced product allows the correct addressing and the correct association of the addressee-specific blog insert, these two method steps also being able to be performed in the converse order.

Usually, only a certain proportion of a printed product's edition, for example the daily edition of a daily newspaper, is delivered to the readers by mail using an address. A large portion of the daily edition is sold anonymously, for example at kiosks, and a further portion is delivered via contracts to subscribers in certain regions. Partial individualization of the printed product is appropriate only for directly addressed newspapers and newspapers delivered to known subscribers. Kiosk sales, on the other hand, account for nonindividualized standard products. The invention thus provides the option of integrating the production of nonindividualized standard products and of partially individualized printed products in one process. In doing this, the present invention allows not only individual addressing of a newspaper and the addition or attachment of blog articles compiled on an addressee-specific basis, but it also allows the addressee-specific or at least region-specific assembly of a selection of subproducts to form an addressee-specific or region-specific end product.

A further extremely advantageous aspect of the present invention has been found to be the introduction of control instructions for possible handling steps, connected downstream of the conventional printing process, or handling units, such as supply stations, into the identification means, preferably into the ID tag. In the simplest case, the control instruction regarding whether a particular feeder is intended to insert a subproduct into a main product can be read off directly from the main product by a suitable optical sensor connected upstream of the feeder. The present invention therefore affords an extremely simple interface which allows workstations, as from third-party providers, to be integrated into an existing production system. In the case of the optically readable ID tags, for example in the form of a barcode, the workstation to be integrated does not need to be connected to a superordinate system and actuated, for the product to be handled, with a control instruction, but rather it can operate autonomously, since the respective product provides the instruction for execution or omission of the work step itself.

The identification means (IM), which the inventive method involves associating with every main product or subproduct directly after forme-bound production, therefore contains information which operatively connects the relevant digital printing station, or another apparatus for generating the information to be stored in the identification means (IM), to the product such that it is functionally connected thereto at least during the production process. In the example which has already been mentioned several times, the information contained in a printed-on ID tag is a product identifier which differs individually for each product, previously referred to, contained and readable as an indification. If an installation produces 100,000 copies of an edition of the example newspaper, accordingly 100,000 individual product identifiers are generated and printed on. The product identifiers preferably already have an associated piece of information relating to the addressee, or said information is even contained in readable form in the product identifier. Alternatively, this association can be made at a later time downstream in the production process. In the former case, by way of example, the individual product identifier, which is already associated with a subscriber, preferably has addressee-specific control information associated with it and integrated accordingly into the ID tag during the actual indification. By way of example, this addressee-specific control information comprises the instruction to a downstream feeder to insert a subproduct into the addressee-specific main product. If, by way of example, subscriber Sample has ordered subproducts from the areas of motoring, economy and sport as part of his subscription, the printed-on ID tag will comprise the relevant positive control codes for precisely these three subproducts, and the addressee-specific "Sample" product will control the feeders for the subproducts from the areas of motoring, economy and sport as it passes through the production path such that they respectively insert one subproduct. By contrast, all other feeders will not be activated, which means that the "Sample" product produced comprises only the subproducts required by Mr Sample. Accordingly, it is also possible to make a negative selection, which means that Mrs Meier can order a newspaper without a motoring or sports section, or without a subproduct from the areas of motoring and sport. On the basis of this customer order, which is stored in the customer database of the superordinate control system, negative control codes for precisely these three subproducts are printed on during indification, that is to say when the "Meier" ID tag is fitted. If there are seven subject-specific subproducts in the unaltered standard product, for example, Mr Sample would receive only his three required subproducts—motoring, economy and sport—besides the main product, while the system based on the invention assembles the main product with the remaining four subject-specific subproducts for Mrs Meier.

Assembly controlled in line with the invention can advantageously be accomplished by means of an apparatus for gathering in the broad sense. Gathering in the broad sense is intended to be understood to mean both gathering in the narrower sense and insertion and assembly. To produce such printed products using high-capacity methods, gathering, insertion and assembly drums or corresponding sections for gathering, insertion and/or assembly are known, for example from Ferag AG. In this case, gathering involves saddle-shaped supports, and insertion and assembly involve V-shaped compartments, being continuously routed past a plurality of addition stations, and each supply device usually adds a further component, for example a further sheet or a further subproduct, to the product which is produced. Gathering starts with an innermost folded sheet, insertion starts with an outermost, folded sheet or main product, and assembly starts with a first usually unfolded component. A person skilled in the art is aware that gathering, insertion and assembly methods can be combined as appropriate. The known high-capacity devices are currently able to achieve capacities of 40,000 to over approximately 80,000 products per hour. The conveying path for the printed products between two feeders or other handling stations preferably comprises, for example in insertion drums from Ferag AG, a respective region of cross-feed, in which it is preferably possible to mount a sensor, for example in the form of a barcode reader, past which the product to be handled is moved and read at a suitable speed when travelling on the production path. In the case of gathering apparatuses, such as the saddle-stitching drums from Ferag AG, as are known from U.S. Pat. No. 5,324,014, for example, the sensor is preferably arranged in a saddle-shaped support in the region of cross-feed between two supply stations. The sensors may also be arranged at a distance from the apparatus for gathering, insertion or assembly, as is known from U.S. Pat. No. 5,613,669 (Ferag AG). In the case of gathering in the narrower sense, it has been found appropriate to put the product identifier on an inner side of the prefold in each case, for example. For handling in insertion drums, this should accordingly be on an outer side. For a person skilled in the art, the terms main product and subproduct have a clear meaning in connection with the aforementioned types of assembly, gathering and insertion, and he knows the respective relative position of the products with respect to one another, their orientation in the production process and the chronology of their supply.

A crucial advantage of the invention is that the addressee-specific assembly is controlled only by the information contained in the ID tag, without any direct control instruction from a superordinate control system. This not only relieves the load on the superordinate controller to an enormous extent but also makes the method much more robust, since even in the event of total failure of the superordinate controller the already indificated products are assembled correctly. To make the system even more stable, all the information required for generating the ID tags for an entire edition is stored in the relevant unit, for example in the digital printer in the rotary section, so that it is available locally and independently of the superordinate controller.

Both example products can then be individualized still further on an addressee-specific basis in line with customer requirements. For example, an addressee-specific blog insert relating to the special subject Champions League and instances of corruption in professional football can be enclosed with the “Sample” product, and the “Meier” product is provided with a blog insert relating to the subjects of environmental scandals in China and the suppression of linguistic minorities in the former Soviet Union. Whereas, in the case of product individualization by means of addressee-specific assembly, the selection of subjects is limited to the ready-made, conventionally produced subproducts, the selection of subjects for compiling the blog insert is almost unlimited. The preselection for the blog subjects is, as already mentioned, made by the subscriber, preferably using an online portal, and, like the selection of the subproducts, can also be changed as often as desired, even from issue to issue, and stored as appropriate in the addressee-specific subscriber profile.

In addition to the individualization which is performed on behalf or at the request of the addressee/subscriber, the present invention provides the option of taking the addressee-specific subscriber profiles, or the selection of the subproducts and/or the blog subjects, as a basis for providing the end product to be produced with addressee-specific advertising. This can be done in the area of assembly for example by inserting target-group-specific high-quality conventionally produced advertising inserts, sticking in exactly the same postcards, vouchers or product samples and, in the case of digitally printed inserts such as the blog insert, by integrating addressee-specific advertisements into the insert layout. A person skilled in the art can see the enormous potential for target-group-oriented advertisement, through to fully individualized advertisement, which is provided by the system according to the invention, particularly also by the integration of forme-bound high-capacity printing processes and non-forme-bound printing processes in the production of a partly individualized printed product, and is capable, without any inventive involvement, of exploiting this potential by virtue of need-based adjustments for the specific individual case.

The fact that the method according to the invention is used to produce inventive, partly individualized products integrated with non-individualized standard products in a preferably serial or partially parallel production path means that it is also possible to provide new solutions to problems in addressing with missing or incorrectly assembled partly individualized products, and since the direct or indirect identification of the products as proposed by us. During indification of the main products, the non-individualized standard products and the partly individualized products are preferably put into an order which ensures that, towards the end of the production path, prior to the addressing, there are respective mini clusters of a respectively partly individualized product and one or more non-individualized standard products. Should an error occur during the addressing, or should a product partly individualized on an addressee-specific basis be missing, the or one of the immediately subsequently non-individualized standard products can be addressed as a replacement.

To prevent negative customer reactions, a further embodiment of the invention provides for the addressee to be informed that he is receiving not his subscribed partly individualized product but rather a non-individualized standard product. The subscriber can be informed by means of an additional block of text, preferably created together with the addressing using digital printing, or by means of the downstream affixing of an appropriate note. This can be accomplished very elegantly using an apparatus, as known from EP1106550, EP1086914 and EP1275607 from Ferag AG and established extremely successfully on the market under the trademark MEMOSTICK®. To increase customer loyalty still further, the MEMOSTICK® note with the information about the wrong product may additionally comprise a voucher for a free purchase of another printed product from the respective publishing house.

To implement the inventive systems with the identification means (IM) described previously as electronically readable or read/writable tags, sensors in the form of known electronic writers or read/writers are used which are suitable for contactless data transfer and change of identification. These system elements are also generic interfaces which simplify the integration of workstations or system components from third-party providers.

BRIEF DESCRIPTION OF THE FIGURES

Preferred embodiments of the methods and systems according to the invention are described below with reference to the drawings, in which.

DETAILED DESCRIPTION OF PREFERRED EMBODIMENTS

Figure 1:
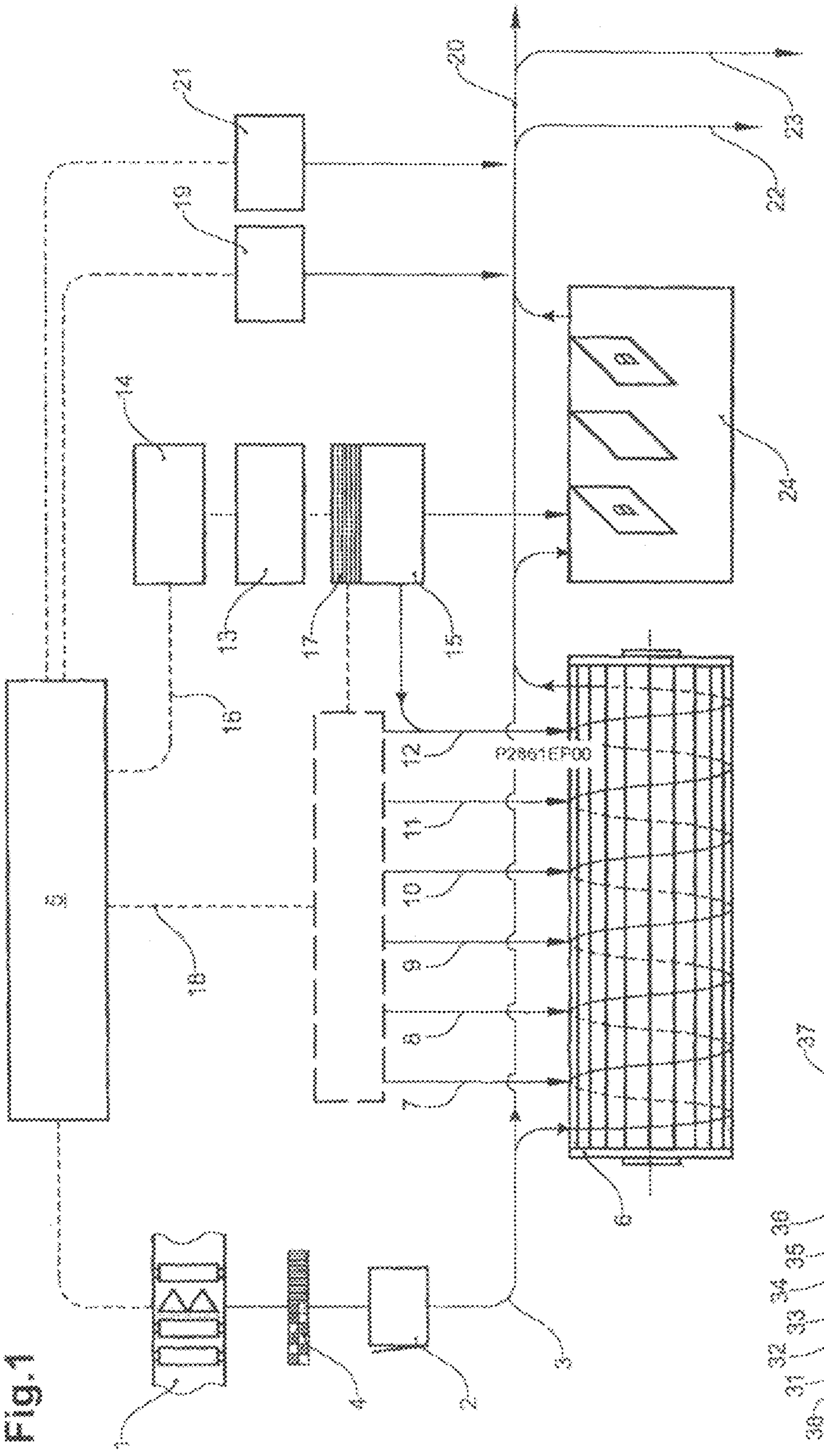
FIG. 1 shows the basic sequence of a method and design of a system based on a preferred embodiment of the invention.

FIG. 1 shows the basic sequence of a preferred embodiment of the method according to the invention. It must be stressed that fundamental elements of the invention have been omitted from this overview for the sake of clarity. The process within and directly after the conventional high-capacity printing press 1 is not shown in more detail here, but rather it is assumed that output products, in this case main products 2, are conveyed along a conveying line 3 by means of conveying means—not shown further—or in a conveying installation. In the exemplary embodiment shown, the main products are provided with an ID tag 4 immediately downstream of the rotary section 1, said ID tags being printed on by means of a digital printing unit—not shown in the figure—for example a high-capacity InkJet printer. Each main product 2 which leaves the rotary section has an associated explicit product-specific ID tag 4. The addressee-specific information, or the control instructions, for creating the ID tags 4 is delivered by a superordinate control unit 5. The main products 2 provided or indificated with a respective product-specific ID tag 4 are supplied to insertion drum 6 for further processing. In said insertion drum, subproducts are supplied from storage units, such as rolls or six feeders 7-12. As described previously, but not shown in the schematic figure, a respective cross-conveying unit connected upstream of the feeders 7-12 in the insertion drum 6 comprises a sensor for capturing a piece of product-specific control information from the ID tag 4. A 1-bit code is sufficient for the control information encoded in the ID tag, since the feeder requires only the information regarding whether or not it needs to insert a subproduct for the respective main product. It is obvious that a wide variety of partly individualized intermediate or end products can be produced after passing through the six feeders 7-12, depending on the control instruction in the ID tag 4. The selection from six subproducts allows all variants from the mere main product to the main product with six different inserted subproducts. The subproducts inserted by means of the feeders 7-12 shown may be conventionally produced subproducts of first or second order with editorial content, or may be pure advertising inserts or combinations of the two. In general, it is true that the subproducts may also be region-specific products which are not only able to be supplied on an addressee-specific basis, but rather are added to a portion of the edition which is intended for this very region.

Such products comprise the regional portion of a newspaper as well as an advertising insert which is customized to the purchasing power of a particular region or a particular neighbourhood.

After passing through the feeders 7-12, the conveyed products are routed past a blog feeder 13, which can supply a blog insert 15 to the already partly individualized intermediate product or to the still non-individualized standard intermediate product. The blog inserts 15 are printed on an addressee-specific basis in a digital printing unit 14, with the requisite layout information or the requisite files with the data to be printed, preferably in PostScript or PDF format, in turn being sent to the digital printer 14 by the superordinate control unit 5 via a data line 16. The blog feeder 13 comprises a buffer store 17 in which a plurality of addressee-specific blog inserts 15 are held for insertion. The superordinate control unit adjusts the printing sequence for the addressee-specific blog inserts 15 to the address-specific intermediate products partly individualized in the upstream process of assembly such that the blog inserts 15 are held for insertion in the correct order. The superordinate controller stipulates the product order or sequence during the actual indification of the main products such that each main product to be provided with a blog insert is preferably followed by at least one non-individualized standard intermediate product. The addressee-specific multibit code in the ID tag thus needs to be read only by one sensor in the conveying direction upstream of the blog feeder 13, and the appropriate blog insert 15, which is preferably provided with an identical addressee-specific multibit code in an ID tag, which is not shown, can be inserted. Should a partly individualized address-specific intermediate product for which an appropriate blog insert is held be missing on account of a malfunction in the upstream production path, the blog insert held in the blog feeder for the purpose of output in the frontmost position is inserted into the next non-individualized standard intermediate product. The superordinate controller 5 is informed about this operation by the feeder and associates the addressee-specific information from the inserted blog insert with the multibit code of the previously non-individualized standard intermediate product. The non-individualized standard intermediate product has now become a partly incorrect individualized address-specific intermediate product which is provided with the correct address, appropriate to the blog insert, in a downstream addressing unit. It is a quite important advantage of the intermediate product sequence according to the invention that a missing intermediate product to be addressed can be replaced from the product stream, and no additional apparatuses are required for supplying or storing reserve intermediate products. The advantageous selection of the sequence of anonymous, non-individualized standard intermediate products and individualized intermediate products to be addressed in the product stream, also called interleaving, inherently comprises the requisite reserve of non-individualized standard intermediate products and provides these extremely promptly for the missing intermediate product for the purpose of further address-specific individualization.

The addressing unit is therefore provided with all the subproducts to be addressed in the correct order, so that the correct sequence of the addressed products is uninterrupted. This allows the addressed products to be correctly bundled or combined into packets for subsequent delivery without the need for any post-processing.

Figure 5:
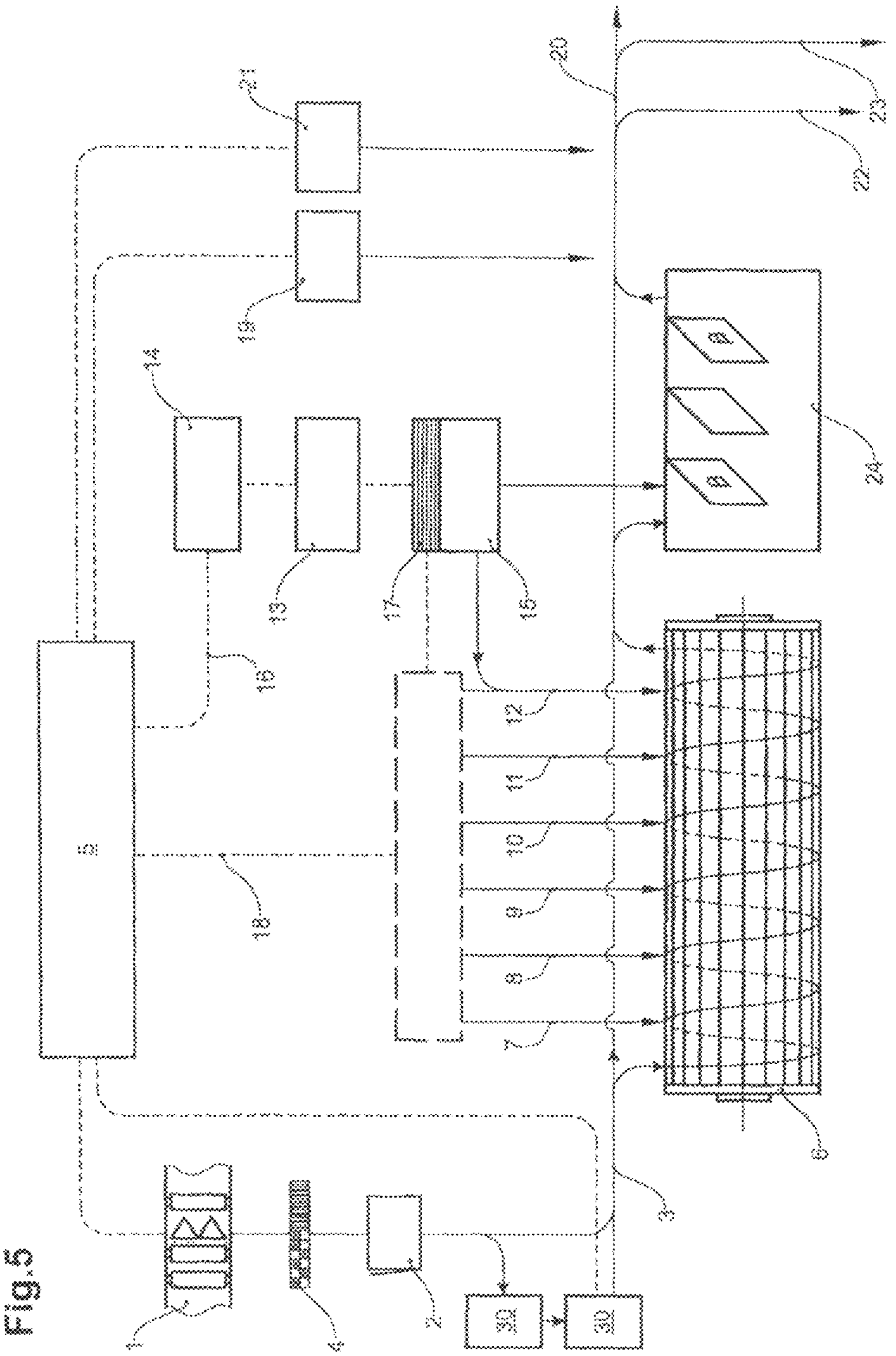
FIG. 5 shows the basic sequence of a method and design of a system based on a further preferred embodiment of the invention.

In FIGS. 1 and 5, the inventive sequence of the intermediate products is respectively symbolized by virtue of the individualized intermediate products to be addressed being labelled B in the product stream, whereas non-individualized standard intermediate products arranged between these do not have any specific label.

In line with the present invention, the sequence of individualized intermediate products B to be addressed and of nonindividualized standard intermediate products can be customized to the typical malfunctions of the processing installation. If it can only be expected that individual products are missing then the product sequence is chosen such that in the course of the conveying line a respective group of intermediate products partly individualized on an addressee-specific basis is followed by at least one, preferably a plurality of, non-individualized standard products. The group of intermediate products partly individualized on an addressee-specific basis is preferably no larger than a group which usually forms a package for postal dispatch. Preferably, the group is at most half the size. If the addressed products do not necessarily need to be printed at the start of an edition in order to allow them to be delivered on time, it is even preferred to keep down the size of the groups of intermediate products partly individualized on an addressee-specific basis. A recurrent series of a respective intermediate product B partly individualized on an addressee-specific basis and at least one, preferably a plurality of, non-individualized standard intermediate products ensures that for every missing or incorrect intermediate product B partly individualized on an addressee-specific basis there is a non-individualized standard intermediate product available immediately afterwards.

The channelling-out of incorrect products during further processing in printing is known to a person skilled in the art and does not need to be explained further at this juncture. If relatively large groups of missing intermediate products partly individualized on an addressee-specific basis can be expected, the group sizes of the non-individualized standard intermediate products are customized accordingly. In line with the present invention, the previously described indification of the main products from the superordinate controller 5 allows very flexible reaction in the event of loss of products. By way of example, if assembly of the products experiences an error which produces a gap of 40 intermediate products, the controller detects the error and the number of products affected, for example via a field bus 18, as indicated in FIGS. 1 and 5, and dynamically associates the relevant individualization steps for the missing products with an appropriate number of main products, not intended for addressee-specific individualization, from the production 1 or from a store 30.

In one preferred embodiment, the main products are not indificated, i.e. provided with the ID tag 4, until after they have been supplied from the store 30. Regardless of whether the main products originate online from the rotary section or offline from a storage unit, they can in this way be indificated in the order in which they are fed into the further processing.

In the advantageous embodiments shown in FIGS. 1 and 5, there is a MEMOSTICK® unit 21 arranged downstream of the addressing unit 19, said MEMOSTICK® unit allowing partly incorrect, addressed end products to be provided with a MEMOSTICK® note which informs the recipient about the error and if necessary provides a form of redress.

Similarly, addressed end products in which the ordered blog insert is missing, for example, can be provided with a piece of error information for the subscriber.

In other likewise preferred embodiments, this information relating to the incorrect product is additionally printed onto the main product or an address sleeve during addressing.

A diverter 20 or an element with a similar action then separates the individually addressed end products 22 from the non-individualized standard end products 23, and splits them into two separate product streams which are supplied to dispatch in a known manner. In further preferred embodiments, the diverter for separating the streams is arranged right after the addressing or after the blog feeder. The speed of the products to be conveyed during addressing is reduced as a result, but the simple option for correcting errors during addressing is lost.

Figure 2:
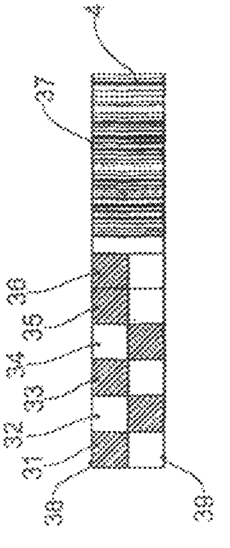
FIG. 2 shows an ID tag based on a preferred embodiment of the invention, as may be used in the method shown in FIG. 1.

FIG. 2 shows an example of an ID tag 4 as may be used in the method shown in FIG. 1, for example. The left-hand region of the tag shows six single-bit codes 31-36 which, by way of example, can control the six feeders 7-12 shown in FIG. 1. A pixel in the top row 38 can provide encoding for the execution of the insertion by the respective feeder, while a pixel in the bottom row 39 leaves the respective feeder inactive. In the example in FIG. 2, the subproducts from the feeders 7, 9, 11 and 12 would be inserted into a main product which has the code shown. In the right-hand region, the ID tag 4 comprises a multibit code 37 which contains the product-specific information and may additionally already comprise address-specific information.

Figure 4:
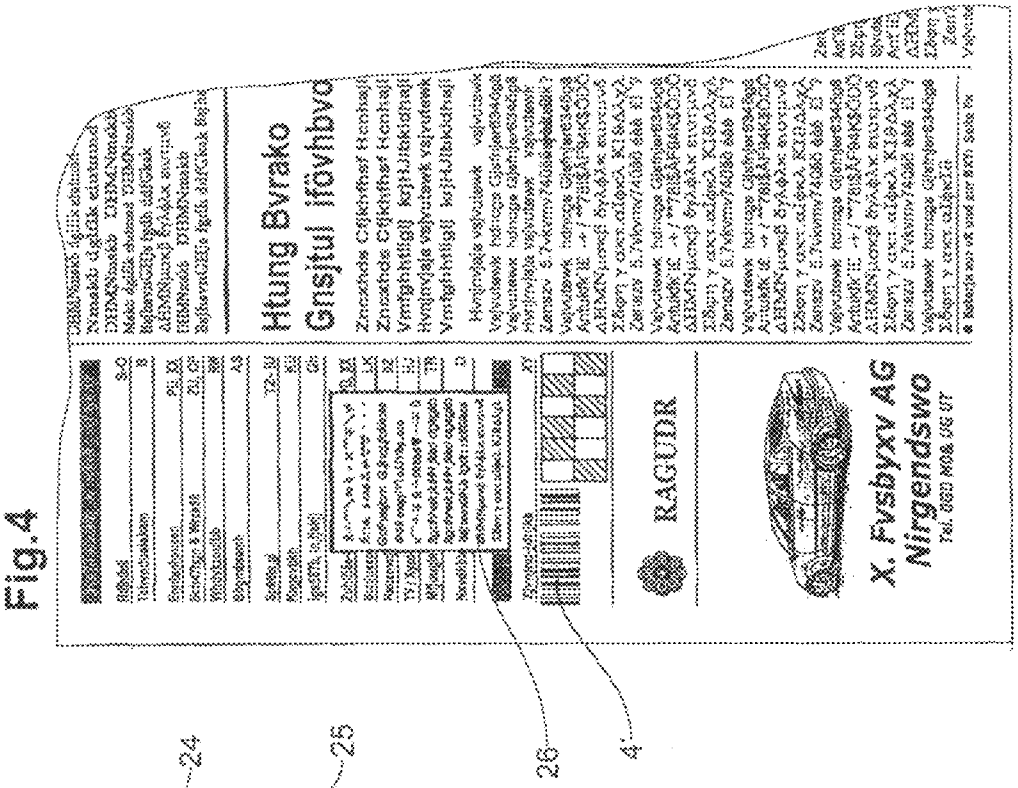
FIG. 4 shows a torn-out section from the front page of a further printed product based on a preferred embodiment of the invention with a digitally printed ID tag and a piece of MEMOSTICK® information relating to a production error.
Figure 3:
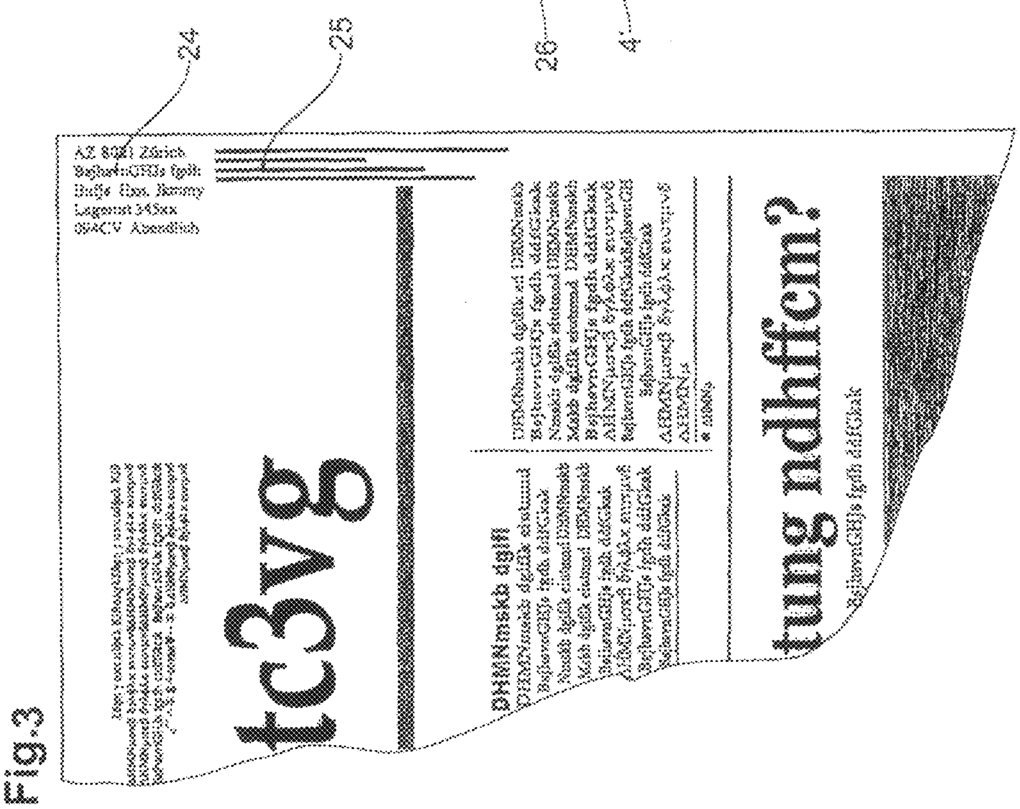
FIG. 3 shows a torn-out section from the front page of a printed product based on a preferred embodiment of the invention with a printed address and a piece of information relating to a production error.

FIGS. 3 and 4 show examples of products assembled incorrectly in which the addressee is informed about his incorrect newspaper by printed text 25 in direct proximity to the delivery address 24 in FIG. 3 or by a MEMOSTICK® note 26 above an ID tag 4' in FIG. 4.

In further embodiments—not shown in the figures—of the present invention, main products and/or subproducts and particularly the inventive blog inserts are produced using high-capacity digital printing systems, which can currently print up to 250 A4 pages per minute. From experience, it can be assumed that the performance of these high-capacity digital printing systems will increase considerably in the next few years, and costs will probably fall at the same time.

FIG. 5 describes a further preferred embodiment of the present invention, in which the main products 2 from the rotary section 1 are buffer-stored on rolls 30 in a discpool, for example. If a change of disc in the rotary section results in an interruption to production, the previously printed main products can be handled and supplied to further processing. In line with further advantageous embodiments, which are not shown in the figures, identification does not take place right in the rotary section or directly after the rotary section but rather takes place only during handling or during the subsequent supply of the handled products to further processing.

If the ID tag 4' remains readable on the main product, as shown in FIG. 4, incorrect products which have been removed during further processing can be identified using hand scanners or a checking station, and the product information relating to the incorrect product can be requested from the controller online and displayed on the scanner or the checking station. This allows the operating personnel to be informed in the simplest way about the error and the steps required in order to correct it. If a particular subproduct has not been inserted in the product, for example, this error information is detected in the controller 5 and, when the ID tag is read in on the checking station, the information is automatically displayed on the checking station and the worker is informed of which subproduct needs to be added, so that manual inspection of the incorrect product is dispensed with.

The ID tags which remain on the product also provide publishers with a simple way of identifying returns, particularly from kiosk sales. The product-specific individual ID tags based on the present invention must not be confused with commercial barcodes, which are already used today in order to identify a respective edition of a newspaper. These known barcodes are standardized according to ISO/IEC 15420 and are used only with a valid number, for example an EAN number. According to EAN General Specifications, two-digit or five-digit supplementary codes can be printed directly next to the EAN in order to encode the edition number of a newspaper or periodical. An individual product identifier is not possible with the known commercial barcodes.

Since the present invention also allows the subproducts to be indificated, that is to say provided with ID tags, for example, the ID tag on the subproducts can be used as an inspection code during supply in order to ensure the correct assembly of the product. The new system therefore allows the ID tags on the main products to be used for individual identification and, as described above, as a control code, and at the same time it is possible for ID tags on the subproducts to be used as inspection codes. Just simple alignment of corresponding 1-bit codes on the main product and the subproduct is sufficient to inspect a correct supply. Since such inspection can be performed using very simple means directly at the respective supply or handling station, the superordinate control system is relieved of load to an enormous extent. To represent this relief, FIG. 5 shows all the connecting lines between the superordinate controller 5 and the respective production units as dashed lines.

FIG. 5 likewise indicates that blog inserts 15 can be inserted into the product B either using a supply apparatus 12 or by means of a processing apparatus 24, connected downstream of the processing drum 6, which is preferably in turn a processing drum or a circulating system.

The invention claimed is:

1. A method for producing a printed product, comprising:

providing a printed product, produced in a forme-bound high-capacity printing process, in the form of a main product (2) or a subproduct, with an identification means (IM) thereon which comprises a piece of individualizable product-specific information, wherein at least two further downstream individualization steps are performed, wherein the identification means allow the piece of information which is to be added in the at least two further downstream individualization steps to be associated with the respective product, and wherein in the course of a conveying line (3) the product to be created is individualized by means of addressee-specific assembly of a selection of conventionally produced subproducts and the inclusion of at least one further addressee-specific digital printed product, wherein the identification means comprises an ID tag including control instructions for indicating whether or not a handling device needs to insert into the printed product a corresponding conventionally produced subproduct of the selection of conventionally produced subproducts, and the ID tag is provided with product-specific control information readable by sensors on one or more handling devices to directly control and activate the one or more handling devices.

2. The method according to claim 1 wherein the downstream individualization steps comprise addressing and the digital printing of blog articles compiled individually for the addressee.

3. The method according to claim 1 wherein the identification means are selected from the group comprising: i) identification means fitted directly on or to the printed product, ii) identification means associated with the printed product detachably, temporarily and in direct physical proximity,and iii) identification means in the form at an electronic identification code in a superordinate control device, which identification code makes an association, with the aid of software, for each printed product in the production process in relation to the handling stations used in the process.

4. The method according to claim 1 further comprising:

printing the ID tag (4, 4') as the identification means directly onto the printed product with a digital printed method during the forme-bound high-capacity printing process or directly subsequent thereto.

5. The method according to claim 1, wherein the at least one addressee-specific digital printed product comprises blog articles, preferably in the form of a blog insert.

6. The method according to claim 1 wherein the product sequence in the conveying line comprises, at least in sections, a recurring succession of a respective intermediate product partly individualized on an addressee-specific basis and at least one non-individualized standard intermediate products.

7. The method according Claim wherein the product sequence in the conveying line comprises, at least in sections, a recurring succession of a respective plurality of intermediate products partly individualized on an addressee-specific basis and at least one non-individualized standard intermediate products.

8. The method according to claim 6 wherein in the event of missing intermediate products partly individualized on an addressee-specific basis, an addressee-specific individualization step to be performed is carried out on a subsequent non-individualized intermediate product and said intermediate product is thereby made the partly incorrect individualized address-specific intermediate product.

9. The method according to claim 8, wherein the partly incorrect individualized address-specific intermediate products or exactly the same end products are provided with a piece of information sent to the addressee, preferably in the form of a digital overprint or a sticker or a MEMOSTICK® note, relating to the incorrect product.

10. The method according to claim 1 wherein a digital printing method is used to print the ID tag (4, 4') directly onto a printed product or to fit a label printed with the ID tag or an electrically readable or read/writable electronic memory to the printed product, and wherein the ID tag (4, 4') is preferably in the form of a machine-readable two-dimensional or matrix barcode.

11. The method according to claim 4 wherein the addressee-specific assembly is controlled only by the information contained in the ID tag (4, 4'), without any direct control instruction from a superordinate control system.

12. A system for carrying out a method according to claim 1.

13. The method according to claim 1 further comprising:

fitting the ID tag (4, 4') or an electronically readable or read/writable electronic memory to the printed product during the forme-bound high-capacity printing process or directly subsequent thereto.

14. The method according to claim 1, wherein the identification means is placed on or with the printed product and is read as the printed product coveys along the conveying line to activate the handling device to associate the addressee-specific assembly with the product, or to inactivate at least one other handling device of the conveying line.

15. A method for producing a printed product, comprising:

providing a printed product, produced in a forme-bound high-capacity printing process, in the form of a main product (2) or a subproduct, with an identification tag thereon, the identification tag comprising individualizable product-specific information including control instructions that directly control each of a plurality of autonomous handling devices to instruct at least one of the plurality of autonomous handling devices to insert into the printed product a corresponding at least one conventionally produced subproduct of a selection of conventionally produced subproducts;

conveying the product along a conveying line (3) that includes the handling devices; and individualizing the product by an addressee-specific assembly of the at least one conventionally produced subproduct and at least one further addressee-specific digital printed product, wherein the identification tag on the printed products instructs the at least one of the handling devices to associate the addressee-specific assembly with the product.

16. The method according to claim 15, wherein the identification tag on the printed product is read as the printed product conveys along the conveying line to activate the at least one of the handling devices to associate the addressee-specific assembly with the product, or to inactivate at least one other handling device not included in the at least one of the handling devices.

17. A method for producing a printed product, comprising:

conveying each of a first printed product and a second printed product, each produced in a forme-bound high-capacity printing process, in the form of a main product (2) or a subproduct, along a conveying line (3) that includes autonomously operating product individualizing handling devices;

providing on or with the first printed product a first identification tag comprising individualized product-specific information for the first product;

providing on or with the second printed product a second identification tag comprising individualized product-specific information for the second product that is different from the first identification tag of the first product, wherein each of the first identification tag and the second identification tag includes control instructions for directly controlling whether or not each of the handling devices needs to insert into the printed product a corresponding at least one conventionally produced subproduct of a selection of conventionally produced subproducts;

reading the first identification tag as the first printed product conveys along the conveying line to individualize the first printed product by a first plurality of the handling devices to associate a first addressee-specific assembly of the at least one conventionally produced subproduct and at least one further first addressee-specific digital printed product with the first printed product; and reading the second identification tag as the second printed product conveys along the conveying line to individualize the second printed product by a second plurality of the handling devices that is different than the first plurality of handling devices, to associate a second addressee-specific assembly of the at least one conventionally produced subproduct and at least one further second addressee-specific digital printed product with the second printed product.

* * * * *